United States Patent [19]

Massie

[11] 3,914,307

[45] Oct. 21, 1975

[54] HYDROGENATION OF AROMATIC AMINES

[75] Inventor: Stephen N. Massie, Palatine, Ill.

[73] Assignee: Universal Oil Products Company, Des Plaines, Ill.

[22] Filed: Dec. 27, 1973

[21] Appl. No.: 428,996

[52] U.S. Cl....... 260/563 B; 260/563 C; 260/563 D; 260/584 C; 252/430; 252/466 PT; 252/466 J; 252/466 R; 252/475
[51] Int. Cl.$^2$.................. C07C 85/24; C07C 87/14; C07C 87/36; C07C 87/38
[58] Field of Search........ 260/563 B, 563 C, 563 D, 260/584 C

[56] References Cited
UNITED STATES PATENTS 3,014,966  12/1961  Freifelder et al............. 260/563 D
3,347,917  10/1967  Arthur............................ 260/563 B
3,634,512  1/1972   Poehler et al.................. 260/563 D

*Primary Examiner*—Paul F. Shaver
*Attorney, Agent, or Firm*—James R. Hoatson, Jr.; Raymond H. Nelson; William H. Page II

[57] ABSTRACT

Aromatic amines are hydrogenated by treatment with an atmosphere of a hydrogen-containing gas in the presence of a catalyst system comprising a metal independently selected from Group VIII of the Periodic Table dispersed on an inorganic oxide support and a polyheterocyclic amine having at least one nitrogen atom in the bridgehead position.

10 Claims, No Drawings

HYDROGENATION OF AROMATIC AMINES

This invention relates to a process for preparing an aminocycloalkane by the hydrogenation of an aromatic amine. More specifically, this invention relates to the hydrogenation of an aromatic amine in the presence of an atmosphere consisting of a hydrogen-containing gas and a catalyst comprising a metal independently selected from Group VIII of the Periodic Table dispersed on an inorganic oxide support and a polyheterocyclic amine having at least one nitrogen atom in the bridgehead position. Hydrogenation processes of aromatic compounds are well known in the art. The hydrogenation processes in the prior art have both been thermal and catalytically effected to produce a hydrogenated product. In particular, it has been shown in the prior art that Group VIII metals of the Periodic Table on various inorganic supports may be used in the hydrogenation of aromatic amines, however, said catalytic processes have been much regarded as being ineffective to economically produce aminocycloalkanes from the aromatic amines, particularly when starting with a compound containing two or more aromatic amine groups.

It has also been shown in the prior art that Group VIII metals selected from the Periodic Table and polyheterocyclic amines having at least one nitrogen atom in the bridgehead position have been used in the hydroformylation reactions for the production of aldehydes and alcohols from an olefinic compound. The polyheterocyclic amines have also been shown as catalysts in other processes in organic chemistry, the most common polyheterocyclic amine being 1,4-diazobicyclo[2.2.2]octane, commonly known as DABCO.

In contradistinction to the prior art, it has now been found that aromatic amines may be hydrogenated in a more economically feasible process by treatment of said aromatic amine in an atmosphere of a hydrogen-containing gas in the presence of a heterogeneous catalyst comprising a metal independently selected from Group VIII of the Periodic Table dispersed on an inorganic oxide support and a polyheterocyclic amine having at least one nitrogen atom in the bridgehead position. The utilization of the present invention will enable the manufacturer of the aminocycloalkanes to reduce the magnitude of the reaction conditions and yet maintain the same percentage conversion of the aminocycloalkane, thereby resulting in a savings of energy and money in obtaining the same quantity of the desired aminocycloalkane. It can also be seen that if the process is effected at identical reaction conditions of previous processes that the amount of desired hydrogenated product, namely, the aminocycloalkanes, will be greatly increased with a small added expense, said extra expense only being the original cost of the polyheterocyclic amine compound. The result of the more effective conversion of the aromatic amine will be a reduction in cost of machinery and equipment which will be necessary to effect the reaction at higher temperatures and greater pressures thereby resulting in a lower cost to consumers and better profit margin for the manufacturer.

The desired products of the process of this invention, namely, aminocycloalkanes, are utilized in the chemical industry in many ways. For example, bis-(4-aminocyclohexyl)methane is utilized in the preparation of non-yellowing polyurethane compositions and in the preparation of polyamides while other aminocycloalkanes are utilized in the production of thermal plastic resins; flexigraphic inks; overprint varnish; heat seal and hot melt adhesives; synthetic sweeteners and co-polymerizable epoxy resins for coating, adhesives, concrete topping, patching compounds, castings, laminates, potting and encapsulation.

It is therefore an object of this invention to provide a faster and more inexpensive process for the preparation of the aminocycloalkanes.

A further object of this invention is to provide a process for the preparation of an aminocycloalkane utilizing certain catalytic compositions of matter which will permit a more efficient recovery of the desired product in a more expedient manner.

In one aspect an embodiment of this invention resides in the process for the hydrogenation of an aromatic amine which comprises a treatment of said aromatic amine in an atmosphere consisting of a hydrogen-containing gas at reaction conditions in the presence of a catalyst system comprising a metal independently selected from Group VIII of the Periodic Table dispersed on an inorganic oxide support and a polyheterocyclic amine having at least one nitrogen atom in the bridgehead position and recovering the resultant hydrogenated aromatic amine.

A specific embodiment of this invention resides in a process for preparing 4,4'-bis-(aminocyclohexyl)methane which comprises hydrogenating methylenedianiline in the presence of a catalyst system comprising iridium dispersed on an alumina support and 1,4-diazabicyclo[2.2.2]octane, commonly known as DABCO, at a temperature in the range of from about 50°C to about 250°C and a pressure in the range of from about 1 atmosphere to about 100 atmospheres of hydrogen gas in a medium of tetrahydrofuran, and recovering the resultant 4,4'-bis-(aminocyclohexyl)methane.

Another specific embodiment of this invention resides in a process for preparing aminocyclohexane which comprises hydrogenating aniline in the presence of a heterogeneous catalyst comprising rhodium dispersed on a silica support and 1,4-diazabicyclo[2.2.2]octane at a temperature of 200°C and a pressure of 50 atmospheres of hydrogen gas in a medium of 2-propanol, and recovering the resultant aminocyclohexane.

Other objects and embodiments will be found in the following further detailed description of the present invention.

As hereinbefore set forth, the present invention is concerned with a process for the preparation of an aminocycloalkane utilizing a catalyst system comprising a metal independently selected from Group VIII of the Periodic Table dispersed on an inorganic oxide support and a polyheterocyclic amine having at least one nitrogen atom in the bridgehead position. The reaction is effected under conditions which include an elevated temperature in the range of from about 50°C to about 250°C and preferably in the range of from about 75°C to about 245°C. In addition, another reaction condition involves pressures, said pressures ranging from about one atmosphere up to about 200 atmospheres or more. The superatmospheric pressure may be effected by the entry of pure hydrogen to the reaction vessel or the superatmospheric pressure may be effected by the addition of hydrogen and a substantially inert gas such as nitrogen, helium, argon, etc., whereby the total pressure of the reaction system is equal to the partial pressure of the hydrogen plus the sum of the partial pressures of any substantially inert gases present in conjunction with the hydrogen.

Examples of suitable aromatic amines which are utilized as one of the starting materials in the process of this invention include aryl amines, haloaryl amines, alkylaryl diamines, alkoxyaryl diamines or di(aminoaryl)alkanes. Specific examples of these would include aniline, p-toluidine, m-toluidine, p-toluidine, 2-ethylaniline, 3-ethylaniline, 4-ethylaniline, 2-propylaniline, 3-propyl-o-toluidine, 4-ethyl-m-toluidine, 2-propyl-3-ethyl-p-toluidine, 2-amylaniline, 2-octylaniline, 2-nonyl-3-decyl-p-toluidine, p-aminoanisole, o-aminoanisole, m-aminoanisole, o-ethoxyaniline, m-ethoxyaniline, p-ethoxyaniline, 2-methoxy-3-ethoxyaniline, p-propoxyaniline, 2-methoxy-3-ethoxy-4-propoxyaniline, 2,3-dimethoxyaniline, 3,4-diethoxyaniline, 3,4-dipropoxyaniline, 2,3-dimethoxy-4,5-dipropoxyaniline, 2,3,4-trimethoxyaniline, 3,4,5-tripropoxyaniline, 2-chloroaniline, 3-chloroaniline, 4-chloroaniline, 3,4-dichloroaniline, 2,3-dichloroaniline, 2-bromoaniline, 3-bromoaniline, 4-bromoaniline, 2,3-dibromoaniline, 2,3,4-tribromoaniline, 3-iodoaniline, 3,5-diiodoaniline, 2,3,5-triiodoaniline, 2-methyl-3-methoxy-4-chloroaniline, 2-methoxy-3-bromo-4-ethylaniline, 2-iodo-3-propyl-4-propoxyaniline, 2,4-diamyl-3,5-dipropoxy-6-bromoaniline, o-phenylenediamines, p-phenylenediamines, m-phenylenediamine, 3-methyl-o-phenylenediamine, 2,3-diethyl-p-phenylene diamine, 2-methoxy-p-phenylenediamine, 3-ethoxy-o-phenylenediamine, 4-propoxy-m-phenylenediamine, 4-chloro-o-phenylenediamine, 3-chloro-p-phenylenediamine, 4-chloro-m-phenylenediamine, 2,3-dichloro-p-phenylene diamine, 2-bromo-m-phenylenediamines, 2,3-dibromo-p-phenylenediamines, 2-iodo-m-phenylenediamine, 3,4-diiodo-o-phenylenediamine, methylenedianiline, 1,2-ethylenedianiline, 1,1-bis(4-aminophenyl)propane, 1,1-bis-(4-aminophenyl)propane, 1,1-bis-(4-aminophenyl)butane, etc., however, the halogenated aromatic compounds may react to cleave out the corresponding hydrogen halide gas, depending on the reaction conditions chosen.

The catalytic compositions of matter which are used in the process of this invention comprise a heterogeneous type of catalyst in combination with a polyheterocyclic amine. The heterogeneous catalyst is defined as a combination of a metal selected from Group VIII of the Periodic Table dispersed upon an inorganic oxide support. Examples of suitable Group VIII metals which may be used in the process of this invention would include iron, cobalt, nickel, ruthenium, rhodium, palladium osmium, iridium, platinum or any combinations of the Group VIII metals which would include platinum and iridium; iridium and ruthenium; iridium and rhodium; ruthenium and osmium; ruthenium, iridium, rhodium and platinum; etc. The inorganic oxide supports will include, in particular, alumina, silica, magnesia, zirconia, thallia, etc.

The second component of the catalyst system comprises a polyheterocyclic amine having at least one nitrogen atom in the bridgehead position. The term "bridgehead position" is well established in chemical nomenclature to identify the position of an atom which is common to at least two of the rings of the polycyclic compound. Suitable examples of such polyheterocyclic amines would include all those compounds known as 1,4-diazabicyclo[2.1.1]hexane; 5-oxa-1,4-diazabicyclo[2.1.1]hexane; 2-oxa-1,4-triazabicyclo[2.2.1]heptane; 1-azabicyclo[3.3.1]nonane; 2-oxa-1-azabicyclo[2.2.1]heptane; 1,4-diazabicyclo[2.2.1]heptane; 7-oxa-1-azabicyclo[2.2.1]heptane; 1,3-diazabicyclo[2.2.1]heptane; 1-azabicyclo[3.2.1]octane; 7-oxa-1-azabicyclo[3.2.1]octane; 1,5-diazabicyclo[3.2.1]octane; 1-azabicyclo[3.3.1]nonane, also known as 1-isogranatinine and the oxo, hydroxy and lower alkyl derivatives thereof; 1-azabicyclo[2.2.2]octane also known as quinuclidine as well as the halo, oxo, hydroxy and lower alkyl derivatives thereof; 1-azatricyclo[3.3.1.1$^{3,9}$]-decane; 1,3-diazabicyclo[2.2.2]octane; 1,3-diazabicyclo[3.3.1]nonane; 1,6-diazatricyclo[5.3.1.1$^{4,11}$]dodecane; 2-oxa-1-azabicyclo[2.2.2]octane; 4,6,10-trioxa-1-azabicyclo[3.3.2]decane; 1,5-diazabicyclo[4.2.1]nonane; 1,2,5,8-tetrazatricyclo[5.3.1.1$^{9,11}$]dodecane; 1,4-diazabicyclo[2.2.2]octane also known as triethylene diamine or DABCO and its oxo, hydroxy, halo and lower alkyl derivatives thereof; 1,3-diazadamantane; 1,3,5-triazabicyclo[3.3.2]decane; 1,3,5,7-tetrazabicyclo[3.3.1]nonane also known as pentamethylenetetramine; hexamethylenetetramine; 2-oxa-1,3,4-triazabicyclo[3.3.1]nonene; 1-azabicyclo[4.3.1]decane; 1-azabicyclo[3.2.2]nonane; 1,5-diazabicyclo[3.2.2]nonene; 1,3,5,7-tetrazabicyclo[3.3.2]decane; 1,5-diazabicyclo[3.3.3]undecane, etc., the most common of said polyheterocyclic amines being 1,4-diazabicyclo[2.2.2]octane, commonly known as DABCO.

Examples of reaction media which may be employed when utilizing the catalyst system hereinbefore set forth would include any inert organic media such as tetrahydrofuran, tetrahydropyran, methanol, ethanol, 1-propanol, 2-propanol, 1-butanol, 2-butanol, 1-pentanol, 2-pentanol, 3-pentanol, 1-hexanol, 2-hexanol, and 3-hexanol, etc. It is understood that the aforementioned aromatic amines, Group VIII metals selected from the Periodic Table, inorganic oxide supports, polyheterocyclic amines having at least one nitrogen atom in the bridgehead position and inert organic reaction medias that are only representative of the class of compounds which may be employed, and that the present invention is not necessarily limited thereto.

The process of this invention may be effected in any suitable manner may comprise either a batch or continuous type operation. For example, when a batch operation is employed the aromatic amines are placed in an appropriate apparatus equipped with a source of hydrogen gas along with a catalyst system comprising a Group VIII metal independently selected from Periodic Table dispersed on an inorganic oxide support and a polyheterocyclic amine having at least one nitrogen atom in the bridgehead position, said appropriate apparatus containing, if so desired, an inert organic reaction media. If atmospheric pressure is to be employed, the reaction vessel is then heated to a predetermined operating temperature in the range of from about 50°C to about 250°C with hydrogen gas being forced into the bottom of the vessel and discharged through the reaction media or reactant so as to maintain atmospheric pressure. After maintaining the reactants in the reaction vessel at this temperature and pressure for a reaction time which may range from 0.2 up to about 20 hours or more in duration, heating is discontinued and the reaction vessel allowed to return to room temperature. The reaction mixture is then recovered, separated from the heterogeneous catalyst system by filtration and subjected to conventional means of purification and separation, said means including washing, drying, extraction, evaporation, fractional distillation, etc., whereby the desired aminocycloalkane is recovered. Alternatively, if superatmospheric pressures are to be employed in the reaction the aromatic amine is charged to a pressure vessel such as a rotating autoclave which contains a heterogeneous catalyst comprising a metal independently selected from Group VIII of the Periodic Table dispersed on an inorganic oxide support and a polyheterocyclic amine having at least one nitrogen atom in the bridgehead position, said rotating autoclave containing, if so desired, any appropriate inert organic media. The autoclave is sealed and a stream hydrogen gas or a stream of hydrogen gas plus any substantially inert gas is allowed to enter until the desired operating pressure for hydrogenation is obtained. The autoclave is then heated to the desired operating temperature and maintained thereat for a predetermined time. At the end of this time, heating is discontinued, the autoclave is allowed to return to room temperature and ambient pressure by the discharge of excess pressure. The autoclave is opened and the aminocycloalkane is treated in a similar manner to that hereinbefore set forth whereby the desired products are separated and recovered.

It is also contemplated within the scope of this invention that the hydrogenation reaction process for obtaining the aminocycloalkanes may be effected in a continuous manner of operation. When such a type of operation is employed, the reactants are continuously charged to the reaction vessel containing a heterogeneous catalyst comprising a metal independently selected from Group VIII of the Periodic Table dispersed on an inorganic support, said reaction vessel containing an inert organic media if desired. The vessel is maintained at proper operating conditions of pressure and temperature while a stream of hydrogen gas is forced into the reaction zone to hydrogenate the aromatic amine. The aromatic amine charge stock may be charged to the reaction zone either mixed with the polyheterocyclic amine or in combination with the polyheterocyclic amine and the inert organic diluent or solvent of the type hereinbefore set forth. After completion of the desired residence time, the reactor effluent is continuously withdrawn and subjected to conventional means of separation whereby the desired aminocycloalkane is recovered while any unreacted starting material comprising the aromatic amine is recycled to the reaction zone to form a portion of the charge stock. Various types of continuous operation may be used with the heterogeneous catalytic composition. One such type of operation comprises a fixed bed method in which the catalyst is disposed as a fixed bed in the reaction zone and the aromatic amine and the polyheterocyclic amine is passed over said fixed bed in either an upward or downward flow. Another type of operation which may be employed comprises a moving bed type of operation in which the heterogeneous catalyst and the aromatic amine and polyheterocyclic amine mixture are passed through the reaction zone under a flow of hydrogen either concurrently or countercurrently to each other, or the slurry type operation in which the heterogeneous catalyst is carried into the reaction zone in the aromatic amine-polyheterocyclic amine mixture.

The polyheterocyclic amine may be added once, periodically or continuously as reaction conditions necessitate to obtain the desired effect of increasing conversions of the aromatic amine and yields of the aminocycloalkane.

Examples of aminocycloalkanes which may be prepared according to the process of this invention will include, aminocyclohexane, 1-amino-2-methylcyclohexane, 1-amino-3-methylcyclohexane, 1-amino-4-methylcyclohexane, 1-amino-2-ethylcyclohexane, 1-amino-3-ethylcyclohexane, 1-amino-4-ethylcyclohexane, 1-amino-2-propylcyclohexane, 1-amino-2-methyl-3-propylcyclohexane, 1-amino-2-methyl-4-ethylcyclohexane, 1-amino-2-propyl-3-ethyl-4-methylcyclohexane, 1-amino-2-amylcyclohexane, 1-amino-2-octylcyclohexane, 1-amino-2-nonyl-3-decyl-4-methylcyclohexane, 1-amino-4-methoxycyclohexane, 1-amino-3-methoxycyclohexane, 1-amino-2-ethoxycyclohexane, 1-amino-3-ethoxycyclohexane, 1-amino-4-ethoxycyclohexane, 1-amino-2-methoxy-3-ethoxycyclohexane, 1-amino-4-propoxycyclohexane, 1-amino-2-methoxy-3-ethoxy-4-propoxycyclohexane, 1-amino-2,3-dimethylcyclohexane, 1-amino-2,3-diethoxycyclohexane, 1-amino-3,4-dipropoxycyclohexane, 1-amino-2,3,4-trimethoxycyclohexane, 1amino-3,4,5-tripropoxycyclohexane, 1-amino-chlorocyclohexane, 1-amino-3-chlorocyclohexane, 1-amino-4-chlorocyclohexane, 1-amino-3,4-dichlorocyclohexane, 1-amino-2,3-dichlorocyclohexane, 1-amino-2,3-dichlorocyclohexane, 1-amino-2-bromocyclohexane, 1-amino-3-bromocyclohexane, 1-amino-4-bromocyclohexane, 1-amino-2,3-dibromocyclohexane, 1-amino-2,3,4-tribromocyclohexane, 1-amino-3-iodocyclohexane, 1-amino-3,5-diiodocyclohexane, 1-amino-2,3,5-triiodocyclohexane, 1-amino-2-methyl-3-methoxy-4-chlorocyclohexane, 1-amino-2-ethoxy-3-bromo-4-ethylcyclohexane, 1-amino-2-ethoxy-3-bromo-4-ethylcyclohexane. 1-amino-2-iodo-3-propyl-4-propoxycyclohexane, 1-amino-2,4-diamyl-3,5-dipropoxycyclohexane, 1,4-diaminocyclohexane, 1,3-diaminocyclohexane, 1,2-diaminocyclohexane, 1,4-diamino-2-methylcyclohexane, 1,3-diamino-2methyl cyclohexane 1,2-diamino-3 methylcyclohexane, 4-propylcyclohexane, 1,3-diamino-2-methyl-4-ethyl-5,6-dipropylcyclohexane, 1,4-diamino-2-methoxycyclohexane, 1,2-diamino-3-ethoxycyclohexane, 1,3-diamino-4-propoxycyclohexane, 1,4-diamino-2,3-diethoxycyclohexane, 1,5-diamino-2,4-dipropoxycyclohexane, 1,-2-diamino-2-chlorocyclohexane, 1,4-diamino-3-chlorocyclohexane, 1,2-diamino-4-chlorocyclohexane, 1,4-diamino-2,3-dichlorocyclohexane, 1,3-diamino-2-bromocyclohexane, 1,4-diamino-2,3-dibromocyclohexane, 1,3-diamino-2-iodocyclohexane, 1,2-diamino-3,4-diiodocyclohexane, bis(4-aminocyclohexyl)-methane, 1,1-bis(4-aminocyclohexyl)ethane, 1,1-bis(4-aminocyclohexyl)butane, 2,9-bis(4-aminocyclohexyl)decane, etc.

The following examples are given to illustrate the process of the present invention which, however, are not intended to limit the generally broad scope of the present invention in strict accordance therewith.

EXAMPLE I

In this example 9.9 grams(50mmoles) of methylenedianiline and 80mls of tetrahydrofuran were placed in an autoclave equipped with heating and gas entry devices along with 3.0 grams of a 1 percent iridium dispersed on an alumina support catalyst. The autoclave was pressed with 100 atmospheres of hydrogen and the autoclave and contents thereof were subsequently heated to a temperature of 175°C and maintained thereat for a period of time comprising 4 hours. At the end of this time, heating was discontinued and the autoclave vented, thereby allowing it to return to room temperature and ambient pressure. The product was removed, separated from the catalyst and analyzed by means of gas chromatography instrumentation, said analysis disclosed a 77 percent conversion of methylenedianiline with a 9 percent production of 4,4'-bis-(aminocyclohexyl)methane and a 30 percent production of the half-hydrogenated precursor, 4-aminophenyl-4-aminocyclohexylmethane.

EXAMPLE II

In this example 9.9 grams (50mmoles) of methylenedianiline and 80mls of tetrahydrofuran were placed in an autoclave equipped with heating and gas entry devices along with 3.0 grams of a 1 percent iridium dispersed on an alumina support and 0.15mmoles of 1,4-diazabicyclo[2.2.2]octane which comprised the catalyst system. The autoclave was pressed with 100 atmospheres of hydrogen and the autoclave and contents thereof were subsequently heated to a temperature of 175°C and maintained thereat for a period of time comprising 4 hours. At the end of this time, heating was discontinued and the autoclave was vented thereby allowing it to return to room temperature and ambient pressure. The product was separated, recovered from the catalyst and analyzed by means of gas chromatography instrumentation, said analysis disclosed a 96 percent conversion of methylenedianiline with a 23 percent production of 4,4'-bis-(aminocyclohexyl)methane and 23 percent production of the half-hydrogenated precursor, 4-aminophenyl-4-aminocyclohexylmethane.

It can clearly be seen by a comparison of Example I to Example II that the addition of the 1,4-diazabicyclo[2.2.2]octane thereby forming a catalyst system for the hydrogenation system resulted in an increase of 19 percent additional conversion of the methylenedianiline and a 14 percent increase in the production of the desired aminocycloalkane, namely, 4,4'-bis-(aminocyclohexyl)methane with only a 7 percent decrease in the production of the half-hydrogenated precursor 4-aminophenyl-4-aminocyclohexylmethane.

EXAMPLE III

In this example 93 grams of aniline are added to an autoclave equipped with heating and gas entry devices along with 0.9mmoles of rhodium dispersed on an alumina support and 0.15 grams of 1,4-diazabicyclo[2.2.2]octane comprising the heterogeneous catalyst, said autoclave containing a media comprising 2-propanol. The autoclave and contents thereof are heated to a temperature of 75°C and raised to a pressure of 50 atmospheres as a result of the forced entry of a hydrogen and nitrogen gas mixture and maintained at said pressure and temperature for a period of time comprising 6 hours. At the end of this time, heating was terminated and the autoclave vented thereby allowing it to return to room temperature and ambient pressure. The product is recovered, separated from the catalyst and analyzed by means of gas chromotography instrumentation, said analysis disclosing a substantially high amount of the desired aminocycloalkane, namely, aminocyclohexane. The yields and conversions will be superior to those obtained utilizing a catalyst system comprising the rhodium on alumina alone.

EXAMPLE IV

In this example 108 grams of p-phenylenediamine is added to an autoclave equipped with heating and gas entry devices along with 0.7mmoles of cobalt dispersed on a magnesia support and 0.10 grams of 1,3,5-triazabicyclo[3.2.1]octane comprising the catalyst system, said autoclave containing a media comprising n-butanol. The autoclave and contents are heated to a temperature of 245°C and raised to a pressure of 150 atmospheres as a result of the forced entry of a hydrogen gas mixture and maintained at said pressure and temperature for a period of time comprising 1 hour. At the end of this time, heating was terminated and the autoclave vented thereby allowing it to return to room temperature and ambient pressure. The product is recovered, separated from the catalyst and analyzed by means of gas chromatography instrumentation, said analysis disclosing the desired aminocycloalkane, namely 1,4-diaminocyclohexane. The amount of the aminocycloalkane present will be found to be greater than that produced in an experiment wherein a catalyst consisting only of cobalt dispersed on magnesia is utilized.

EXAMPLE V

In this example 93 grams of aniline are added to a rotating autoclave equipped with heating and gas entry devices along with 0.5mmols of palladium dispersed on silica and 0.15mmols of 1,4-diazabicyclo[2.2.2]octane comprising the heterogeneous catalyst system. The autoclave and contents thereof are heated to a temperature of 75°C and raised to a pressure of 50 atmospheres as a result of the forced entry of hydrogen gas and maintained at said pressure and temperature for a period of time comprising 6 hours. At the end of this time, heating was terminated and the autoclave vented, thereby allowing it to return to room temperature and ambient pressure. The product is recovered, separated from the catalyst and analyzed by means of gas chromotography instrumentation, said analysis disclosing a substantially high amount of the desired aminocycloalkane, namely, aminocyclohexane. The production of the desired aminocycloalkane will be found to be greater than that which is obtained in an experiment performed wherein a catalyst consisting only of palladium dispersed on silica is utilized.

I claim as my invention:

1. A process for the hydrogenation of an aromatic amine selected from the group consisting of (1) aniline, (2) nuclearly substituted anilines possessing from about 1 to about 3 nuclear substituents independently selected from the group consisting of alkyl possessing from 1 to about 10 carbon atoms, lower alkoxy, chlorine, bromine, iodine and amino and (3) di(aminophenyl) lower alkanes, which comprises treating said aromatic amine with hydrogen, at a temperature of about 50° C. to about 250° C. and a pressure of from about 1 atmosphere to about 200 atmospheres, in the presence of a catalyst consisting essentially of a supported Group VIII metal and a polyheterocyclic amine selected from the group consisting of 1,4-diazabicyclo[2.2.2]octane and 1-azabicyclo[2.2.2]-octane, and recovering the resultant hydrogenated aromatic amine.

2. The process of claim 1 further characterized in that the hydrogenation may be effected in an medium comprising an inert organic solvent.

3. The process of claim 2 further characterized in that the inert organic solvent is tetrahydrofuran.

4. The process of claim 2 further characterized in that the inert organic solvent is 2-propanol.

5. The process of claim 1 further characterized in that the metal independently selected Group VIII of the Periodic Table is iridium, the inorganic oxide support is alumina and the polyheterocyclic amine having at least one nitrogen atom in the bridgehead position is 1,4-diazabicyclo[2.2.2]octane.

6. The process of claim 1 further characterized in that the metal independently selected from Group VIII of the Periodic Table is rhodium, the inorganic oxide support is alumina and the polyheterocyclic amine having at least one nitrogen atom in the bridgehead position is 1,4-diazabicyclo[2.2.2]octane.

7. The process of claim 1 further characterized in that the metal independently selected from Group VIII of the Periodic Table is cobalt, the inorganic oxide support is magnesia and the polyheterocyclic amine having at least one nitrogen atom in the bridgehead position is 1,3,5-triazabicyclo[3.2.1]octane.

8. The process of claim 1 further characterized in that the aromatic amine is methylenedianiline and the resultant hydrogenated aromatic amine is 4,4-bis-(aminocyclohexyl)methane.

9. The process of claim 1 further characterized in that the aromatic amine is aniline and the resultant hydrogenated aromatic amine is aminocyclohexane.

10. The process of claim 1 further characterized in that the aromatic amine is p-phenylenediamine and the resultant hydrogenated aromatic amine is 1,4-diaminocyclohexane.

* * * * *